(No Model.)

W. FRYER & F. A. COLES.
MOUNT FOR JUGS OR THE LIKE.

No. 526,104. Patented Sept. 18, 1894.

Witnesses.
Benjamin Clark.
James Fleming

Inventors.
William Fryer.
Francis Adam Coles.
per E. Eaton
Their attorney

UNITED STATES PATENT OFFICE.

WILLIAM FRYER AND FRANCIS ADAM COLES, OF BIRMINGHAM, ENGLAND.

MOUNT FOR JUGS OR THE LIKE.

SPECIFICATION forming part of Letters Patent No. 526,104, dated September 18, 1894.

Application filed April 24, 1893. Serial No. 471,725. (No model.) Patented in England March 8, 1893, No. 5,047.

*To all whom it may concern:*

Be it known that we, WILLIAM FRYER and FRANCIS ADAM COLES, subjects of the Queen of Great Britain, and residents of Birmingham, in the county of Warwick, England, have invented certain new and useful Improvements in Mounts for Jugs or the Like, (for which we have applied for a patent in Great Britain, No. 5,047, dated March 8, 1893,) of which the following is a full, clear, and exact specification thereof.

This invention relates to claret, hot water and other jugs and the like by means of which the lids may be readily attached to and detached from jugs and the like, without employing cement, and consists of a band and screw pin, which band is secured round the jug or the like and carries the lid, and the same is carried out in the following manner, reference being had to the annexed drawings, in which—

Figure 1:
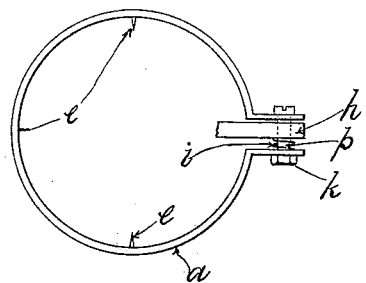
Figure 2:
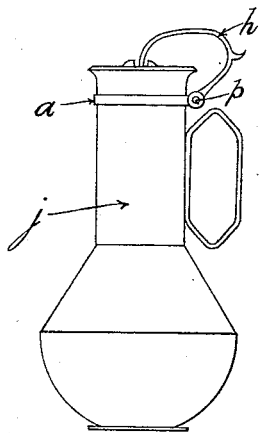

Figure 1 is a plan view of the band adapted for attaching lids to jugs; Fig. 2, a side elevation of a jug fitted with my invention for attaching lids.

Referring to figure 1 $a$ is a band the ends of which are secured by a screw pin $b$. This pin passes through the rod $b$ which carries the lid $f$. In order to insure the band $a$ remaining in position on very smooth surfaces, I provide small projections $e$ on the inside of the band $a$ which engage with corresponding indentations in the jug. $k$ is a small lock nut for securing the screw pin $b$ in position. A small spiral spring $i$ is employed to retain the lid $f$ in its closed position. This spring $i$ surrounds the pin $b$, one end of the spring $i$ being secured in a small hole in the arm $h$ and the other end in a small hole in the end of the band $a$. The hole in the arm $h$ is of a size to allow the arm to rotate freely upon the pin $b$.

Fig. 2 shows the band and lid in position on the jug $j$. It will be seen that by unscrewing the pin $b$ the lid or handle may be readily removed when desired for packing and other purposes.

What we claim as our invention, and desire to secure by Letters Patent, is—

In mounts for jugs in combination, a screw pin, securing the ends of a band having projections on its inner side for engaging in indentations in the jug surrounded by said band; an arm pivoted upon the screw pin between the ends of the said band, said arm carrying the lid; a controlling spring surrounding the screw pin, one end of which spring is attached to the arm carrying the lid, and the other end to the end of the band aforesaid, for the purpose of closing said lid, substantially as described.

In testimony that we claim the foregoing we have hereunto set our hands this 8th day of March, 1893.

WILLIAM FRYER.
FRANCIS ADAM COLES.

Witnesses:
ERNEST HARKER,
J. J. WOODGATE.